UNITED STATES PATENT OFFICE.

LUDWIG MOND AND GUSTAV JÁRMAY, OF WINNINGTON, COUNTY OF CHESTER, ENGLAND.

MANUFACTURE OF SODIUM BICARBONATE.

SPECIFICATION forming part of Letters Patent No. 308,512, dated November 25, 1884.

Application filed February 26, 1884. (No specimens.)

*To all whom it may concern:*

Be it known that we, LUDWIG MOND and GUSTAV JÁRMAY, both of Winnington, in the county of Chester, England, manufacturing chemists, have invented certain new and useful Improvements in the Manufacture of Sodium Bicarbonate, of which the following is a specification.

Bicarbonate of soda as obtained in the manufacture of soda by the ammonia-soda process contains, besides some minor impurities, a certain quantity of ammonia, (probably in chemical combination with the bicarbonate of soda,) which makes this product unfit for most of the purposes for which bicarbonate of soda of the market is used. Moreover, the drying of this crude bicarbonate of soda made by the ammonia-soda process is a very tedious operation on account of its sludgy nature. Washing with water does not free this crude bicarbonate of soda from the ammonia it contains, nor have many attempts to obtain this end by washing it with caustic ammonia (see James Richards's British Patent No. 376 of 1874) or other chemicals led to the desired result. We have, however, discovered that if the crude bicarbonate of soda of the ammonia-soda process be dissolved in warm water and the resulting solution allowed to cool pure bicarbonate of soda separates and all the ammonia remains in solution. If a very pure article be required, all the other impurities can be got rid of by letting the warm solution clear itself either by settling or filtering it before it is allowed to cool.

In carrying out our invention we dissolve the crude bicarbonate of soda in water of about 60° centigrade and separate the insoluble matter, preferably by filtration. The clear solution is treated in different ways, according to the quality or grain of bicarbonate of soda that it is desired to obtain. It is either run warm into pans and allowed to cool slowly or it is first cooled as far as practicable without separation of bicarbonate by means of cooling-pipes or other arrangements, and is then run into pans to cool further and deposit the bicarbonate of soda; or the liquor may be run through a series of troughs or long pans communicating one with the other, so as to continually deposit bicarbonate of soda as it cools in running slowly along; or other means may be employed for keeping the liquor slightly agitated while it is cooling, so as to expedite this operation and to prevent the formation of crusts sticking to the sides of the pans. The bicarbonate obtained by either of these operations being of a crystalline texture, can easily be freed from mother-liquor by a hydro-extractor or other means, and then dried, ground, and dressed, if necessary. The solutions of the crude bicarbonate in water may be advantageously effected under pressure, and preferably in an atmosphere of carbonic acid. Under these circumstances the temperature at which a solution of bicarbonate of soda commences to decompose is much higher than under the ordinary pressure of the atmosphere, and consequently the solution can be effected at a higher temperature and a larger amount of bicarbonate can be dissolved in water. It is, however, necessary to cool this solution to 65° centigrade before the pressure is taken off. The mother-liquor of this operation can be used over several times for dissolving fresh quantities of crude sodium bicarbonate to be treated in the same way till ammonium or other salts accumulate to too great an extent, when the ammonia can be boiled out and the liquor evaporated to dryness to save the chlorides and other salts contained therein; or, preferably, it can be used without previous boiling to replace the water or a part of the water used for washing out of the crude sodium bicarbonate as it comes out of the carbonators the chlorides of sodium and ammonium which it contains. The advantage which the mother-liquor possesses over pure water for this purpose is that, being already saturated or nearly saturated with sodium bicarbonate, it obviates or greatly reduces the loss now sustained by the solution of a portion of sodium bicarbonate.

We claim as our invention—

1. The process of manufacturing pure sodium bicarbonate free from ammonia from the crude impure sodium bicarbonate made by the ammonia-soda process, which consists in dissolving the crude salt under pressure above that of the atmosphere in water heated to nearly the decomposing-point of the sodium bicarbonate at that pressure, separating the insoluble matters, cooling the solution to below 65° centigrade, taking off the pressure, cooling the solution by passing it through pans or troughs, separating the pure sodium bicarbonate thus formed, using the mother-liquor repeatedly to dissolve fresh quantities of crude washed salt, and when it has become too impure boiling out the ammonia or using the mother-liquor for washing the crude salt as extracted from the carbonators, substantially as described.

2. The improvement in the process of obtaining pure sodium bicarbonate free from ammonia from the sodium bicarbonate made by the ammonia-soda process, which consists in dissolving it in warm water at a temperature below the point at which sodium bicarbonate decomposes—viz., about 60° centigrade—separating insoluble matters, and afterward cooling the solution, substantially as described.

3. The improvement in the process of obtaining pure sodium bicarbonate free from ammonia from the bicarbonate made by the ammonia-soda process, which consists in dissolving it in water under pressure at a temperature a little below the point at which sodium bicarbonate decomposes at the pressure used, separating the insoluble matters, cooling to about 65° centigrade before taking off the pressure, and then cooling further, as far as practicable, and removing the sodium bicarbonate formed, substantially as described.

In testimony whereof we have signed our names to this specification in the presence of two subscribing witnesses.

LUDWIG MOND.
GUSTAV JÁRMAY.

Witnesses:
THOMAS H. FORGAN,
G. S. ROTHWELL.